United States Patent

Baker et al.

[11] Patent Number: 5,528,928
[45] Date of Patent: Jun. 25, 1996

[54] CAPACITIVE SENSING APPARATUS FOR SENSING A PLURALITY OF OPERATING PARAMETERS ASSOCIATED WITH AN ENGINE

[75] Inventors: Thomas M. Baker, Peoria, Ill.; George Codina, North Hollywood, Calif.; John W. Crayton, Washington, Ill.

[73] Assignee: Caterpillar Inc., Peoria, Ill.

[21] Appl. No.: 380,894

[22] Filed: Jan. 30, 1995

[51] Int. Cl.$^6$ .................................................... G01M 15/00
[52] U.S. Cl. ............................ 73/116; 73/35.07; 361/290
[58] Field of Search ........................ 73/35, 35 K, 35 KS, 73/35 P, 35 M, 116, 117.3, 35.01, 35.03, 35.06, 35.07; 361/289, 290, 291, 294

[56] References Cited

U.S. PATENT DOCUMENTS

| | | | |
|---|---|---|---|
| 4,035,697 | 7/1977 | Arnold, Jr. | 361/289 |
| 4,147,054 | 4/1979 | Hohenberg et al. | 73/117.3 |
| 4,173,032 | 10/1979 | Janning, Jr. et al. | 361/289 |
| 4,296,629 | 10/1981 | Vuyovich | 73/116 |
| 4,661,695 | 4/1987 | Mori et al. | 250/227 |
| 4,686,847 | 8/1987 | Besocke | 361/289 |
| 4,806,915 | 2/1989 | Rasmussen | 340/686 |
| 5,027,645 | 7/1991 | Leitmeier et al. | 73/116 |
| 5,125,681 | 6/1992 | Brackette, Jr. | 280/707 |

*Primary Examiner*—Richard Chilcot
*Assistant Examiner*—Eric S. McCall
*Attorney, Agent, or Firm*—David M. Masterson; Mario J. Donato

[57] ABSTRACT

In one aspect of the invention, an apparatus for sensing a plurality of operating parameters of an internal combustion engine is disclosed. An energy source supplies electrical energy to the pistons, whereby each piston forms a variable capacitor with the engine housing. The capacitance value of each variable capacitor changes as a function of the relative position of the piston to the housing. An oscillator circuit produces a capacitive signal that is indicative of the capacitance value of each variable capacitor. A microprocessor receives the capacitive signal and responsively determines one of a plurality of operating parameters of the engine.

9 Claims, 12 Drawing Sheets

Fig_1_

Fig-2-

Fig_3_

Fig_4_

Fig-5

Fig_6_

Fig_7A_

Fig_7B_

Fig_7C_

Fig_8_

Fig_9_

CAPACITIVE SENSING APPARATUS FOR SENSING A PLURALITY OF OPERATING PARAMETERS ASSOCIATED WITH AN ENGINE

TECHNICAL FIELD

This invention relates generally to an apparatus for sensing a plurality of operating parameters associated with an engine and, more particularly, to a capacitive sensing apparatus for sensing a plurality of operating parameters of an engine.

BACKGROUND ART

As the electronic age continues to transform technology, it has become prevalent to use electronic sensing devices to monitor the operating parameters of machinery. For example, internal combustion engines are heavily instrumented with electrical sensing circuitry to monitor engine operating parameters in order to provide information that can be used to improve fuel efficiency, power ratings, as well as, to reduce pollutants.

However, as the number of measurable operating parameters increase, the number of sensors required to measure the operating parameters increases proportionally. Unfortunately, the increased number of sensors increases electronic packaging requirements, increases engine cost, and decreases electronic circuit reliability.

The present invention is directed to overcoming one or more of the problems as set forth above.

DISCLOSURE OF THE INVENTION

In one aspect of the invention, an apparatus for sensing a plurality of operating parameters of a mechanical device is disclosed. The mechanical device includes a housing and a piston moveable relative to the housing. An energy source supplies electrical energy to the piston, whereby the piston and the housing form a variable capacitor. The capacitance value of the variable capacitor changes as a function of the relative position of the piston to the housing. An oscillator circuit produces a capacitive signal that is indicative of the capacitance value of the variable capacitor. A microprocessor receives the capacitive signal and responsively determines one of a plurality of operating parameters of the mechanical device.

BRIEF DESCRIPTION OF THE DRAWINGS

For a better understanding of the present invention, reference may be made to the accompanying drawings in which.

BEST MODE FOR CARRYING OUT THE INVENTION

The present invention provides a method for determining a plurality of operating parameters of a mechanical device using a single sensing apparatus. Although the present invention is discussed with relation to an internal combustion engine, it will be apparent to those skilled in the art the that the present invention may equally be utilized in conjunction with other types of machinery including a variable displacement piston pump.

Figure 1:
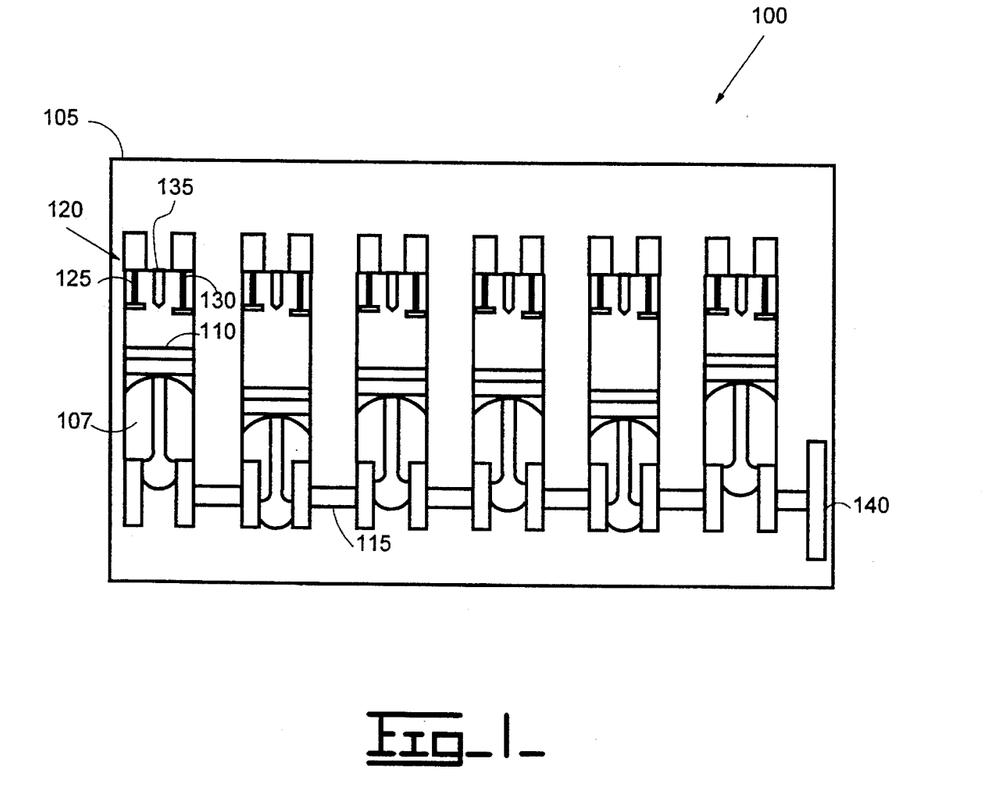
FIG. 1 shows a diagrammatic view of an internal combustion engine.

Referring now to the drawings, FIG. 1 illustrates an internal combustion engine 100. The engine 100 includes a housing 105 having a plurality of engine cylinders 107. Disposed in each cylinder 107 is a piston 110 that is connected to a crankshaft 115. The engine housing 105 additionally includes a cylinder head 120 that holds an intake valve 125, an exhaust valve 130, and an injector 135.

Advantageously, the present invention provides a non-contacting sensing apparatus that monitors a capacitive relationship between the pistons 110 and the engine housing 105. More particularly, the sensing apparatus supplies electrical energy to the pistons 110 via the engine crankshaft 115 by way of the engine flywheel 140. Consequently, since the engine housing 105 is effectively grounded, each piston 110 effectively forms a variable capacitor 200 with the associated engine cylinder wall and head.

Figure 2:
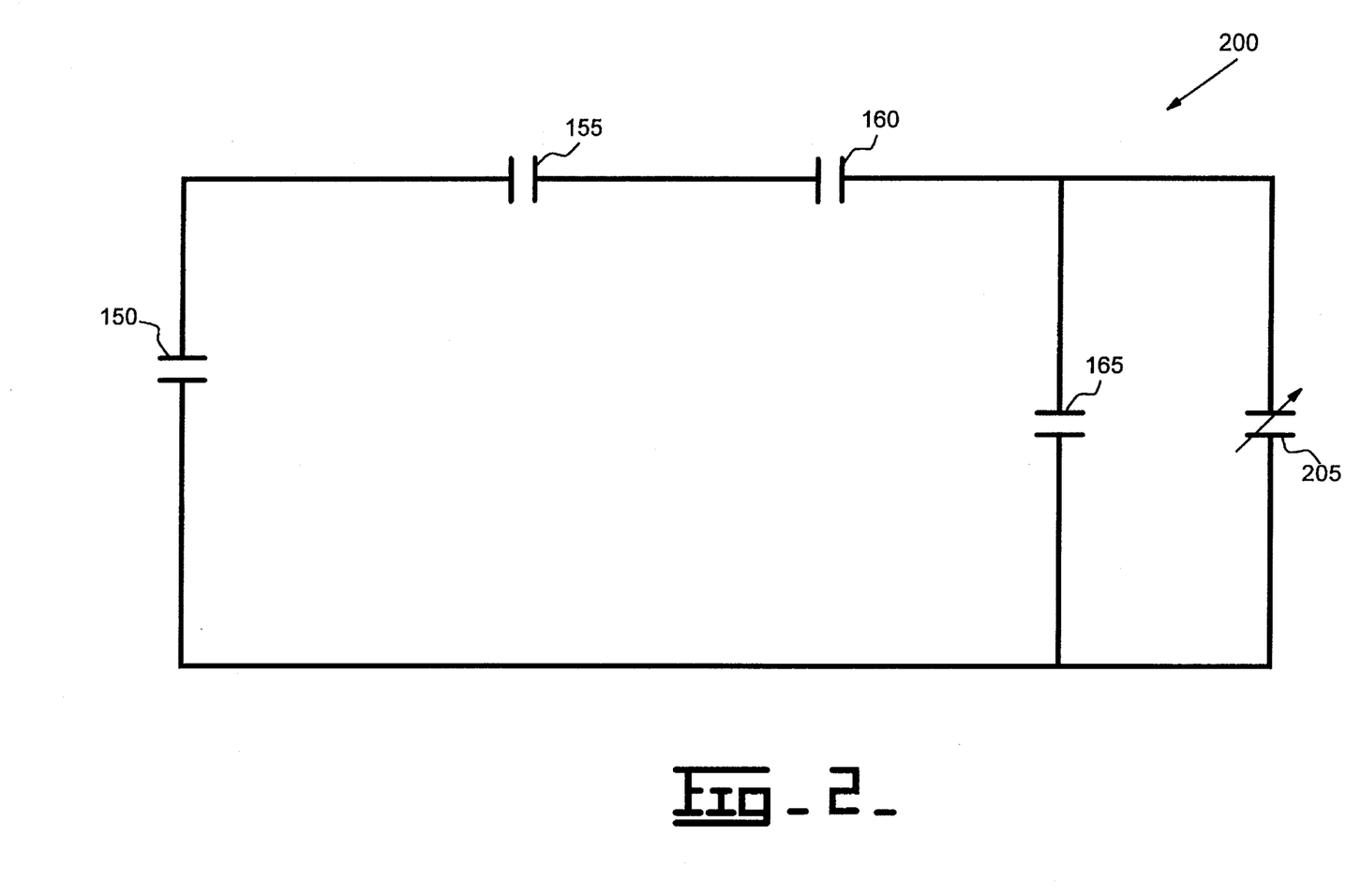
FIG. 2 shows the effective capacitance associated with a engine piston.

The effective capacitive value 200 associated with each piston may be a combination of the capacitance of several engine components, described with respect to FIG. 2. For example, the effective piston capacitance 200 is a function of the capacitance associated with a main bearing 150, a rod bearing 155, a piston pin bearing 160, as well as, the piston-to-wall capacitance 165, and the piston-to-head capacitance 205. The capacitance value that the provides the most information regarding the performance of the engine is the piston-to-head capacitance 205. Accordingly, the majority of the following discussion will be centered around the piston-to-head capacitance 205.

Figure 3:
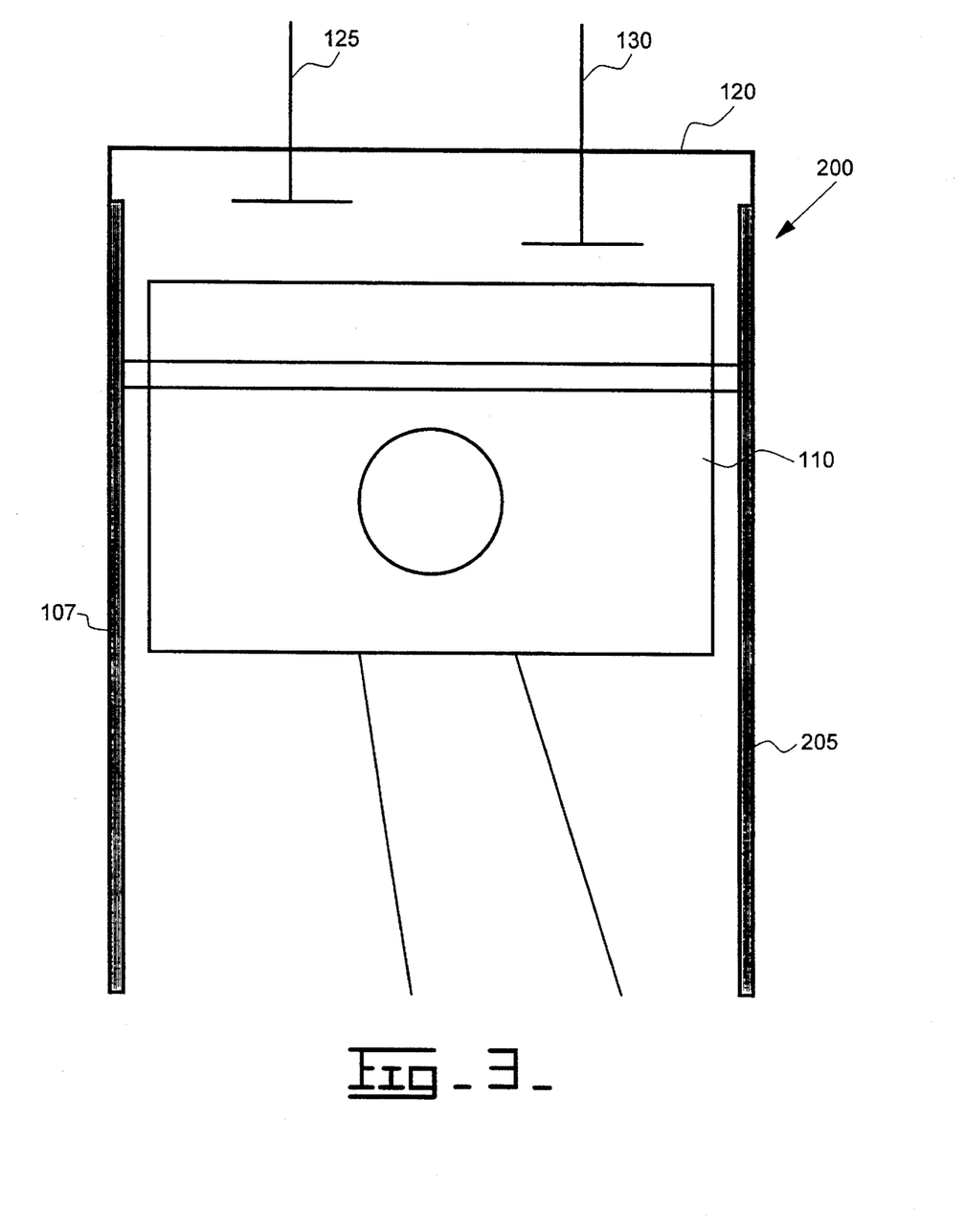
FIG. 3 shows a diagrammatic view of an engine piston and cylinder.

Reference is now made to FIG. 3, which shows an engine cylinder in greater detail. The piston 110 forms a positive electrode, while the cylinder wall 107 and head 120 form a ground electrode. The lubricating oil 205 that lines the cylinder walls, as well as, the combustive gasses formed at the top of the cylinder act as the dielectric of the piston-to-head capacitance 205.

As the piston 110 approaches the cylinder head 120, the piston-to-head capacitance 205 proportionally increases. The greatest piston-to-head capacitance 205 occurs when the piston 110 reaches the Top Dead Center (TDC) position during combustion. Thus, the engine combustive events can be detected by monitoring the capacitance associated with the piston, which will be explained more fully below.

Figure 4:
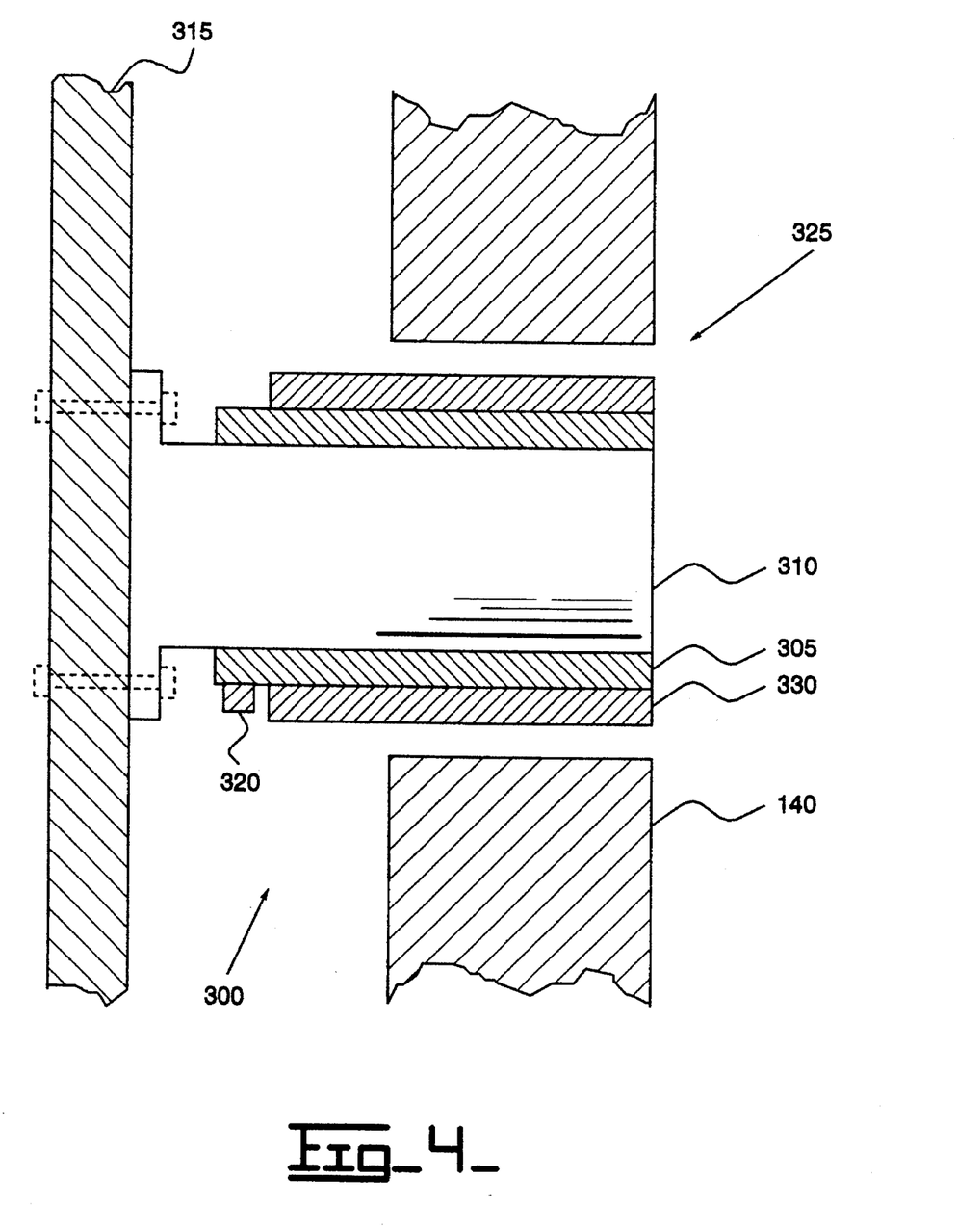
FIG. 4 shows a cross section view of a capacitive coupling associated with the present invention.

Reference is now made to FIG. 4, which shows a diagrammatic view of a capacitive coupling 300 that directs electrical energy to the piston. The capacitive coupling 300 includes a cylindrical tube 305 that is disposed in a bore 310 defined by the flywheel 140. Preferably, the tube 305 is made of a metallic structure such as steel. The tube 305 is held is place by a Lexan holder 310 that is attached to a steel bracket 315. Electrical energy is supplied to the tube 305 via an electrical contact 320. Thus, the steel tube 305 and the engine flywheel 140 act as a fixed capacitor 325. Accordingly, an electric field is coupled from the steel tube 305 to the engine flywheel 140; thereby, energizing the piston 110 via the engine crankshaft 115. Preferably, the capacitive coupling 300 includes a nylon sleeve 330 that is disposed around the tube 305. The sleeve 330, the air gap defined by the sleeve 330, and the flywheel 140 all act as the dielectric of the fixed capacitor 325.

Figure 5:
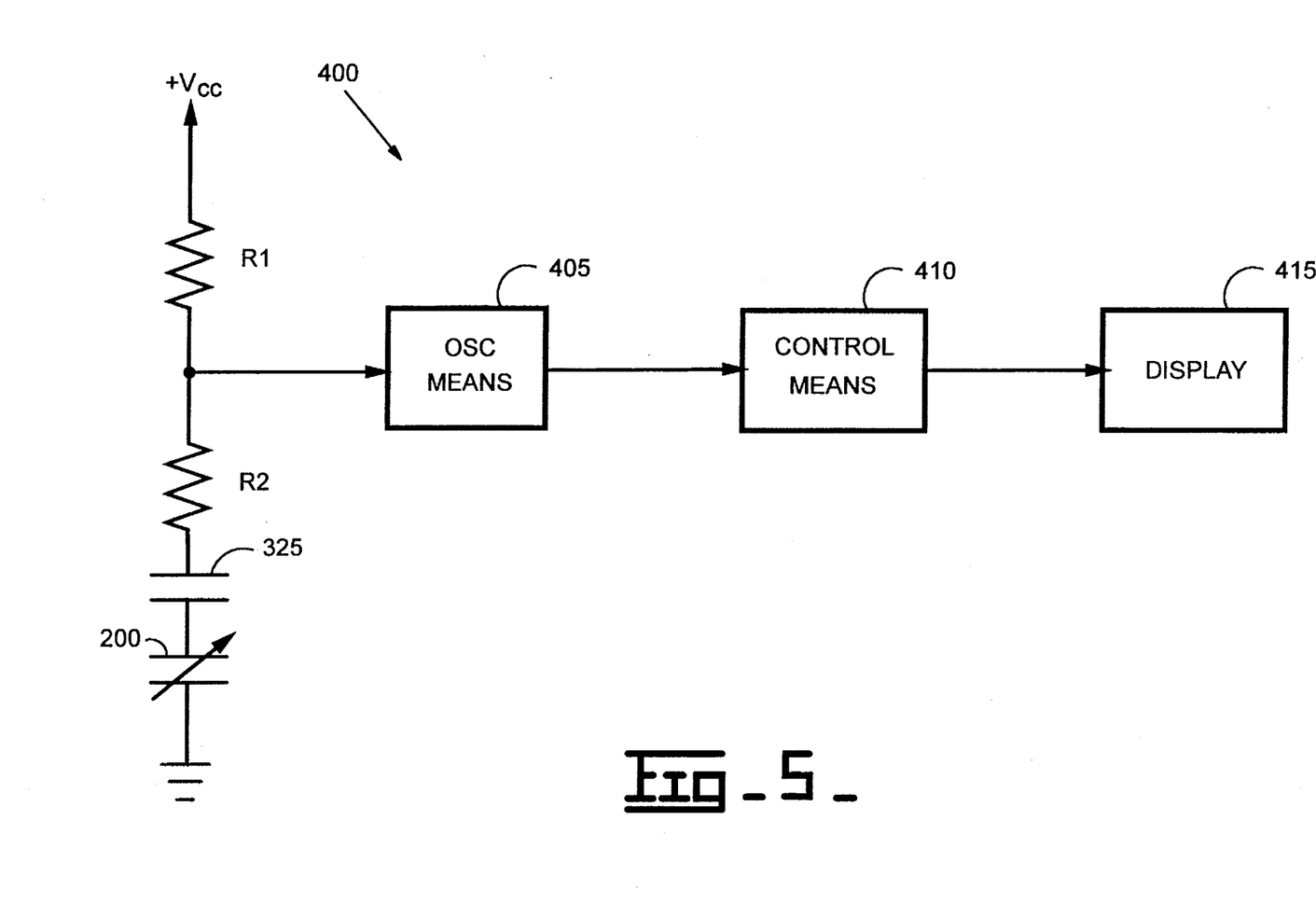
FIG. 5 shows a block diagram of the electronic circuitry associated with the present invention.

A block diagram of the electronic circuitry 400 that is associated with the present invention is shown with reference to FIG. 5. An oscillating means 405 produces a capacitive signal that has a frequency modulated waveform. The capacitive signal is responsive to the effective capacitance 200 associated with the piston(s). That is, the period of the capacitive signal is related to the effective capacitance associated with the piston(s). Preferably, the oscillating means 405 may be manufactured by one of several manufactures, including that provided by National Semiconductor as part no. LM 555.

The capacitive signal is delivered to a control means 410. The control means determines the period of the capacitive signal and responsively determines one of a plurality of engine operating parameters. Preferably, the control means 410 may be a microprocessor based circuit that employs either a look-up table or an empirical equation that is used to determine one of a plurality of engine operating parameters. The look-up table or empirical equation may be based on empirical data that associates the duration of the capacitive signal period with the type of engine operating parameter. Moreover, the microprocessor based circuit may employ Digital Signal Processing (DSP) techniques to further aid in the determining of the engine operating events.

The capacitive signal may be delivered to a display means 415. The display means 411 may provide a visual or audio signal that alerts the vehicle operator or test engineer of one or more of the engine operating parameters.

Thus, while the present invention has been particularly shown and described with reference to the preferred embodiment above, it will be understood by those skilled in the art that various additional embodiments may be contemplated without departing from the spirit and scope of the present invention.

INDUSTRIAL APPLICABILITY

The operation of the present invention is best described with its relation to an internal combustion engine. More specifically, the present invention may be used to determine a number of engine operating parameters.

One such engine operating parameter pertains to the power stroke of each engine cylinder. For example, it is well known that as a piston approaches Top Dead Center (TDC), the pressure within the cylinder rises, which compresses the gaseous mixture within the cylinder. As the gaseous mixture compresses, the dielectric value associated with piston-to-head capacitance 205 increases. Consequently, the piston-to-head capacitance 205 increases as well. Because the capacitive signal period is responsive to the piston-to-head capacitance 205, the capacitive signal may be used to determine the various power strokes of the engine cylinder. To best illustrate this, reference is made to FIGS. 6 and 7.

Figure 6:
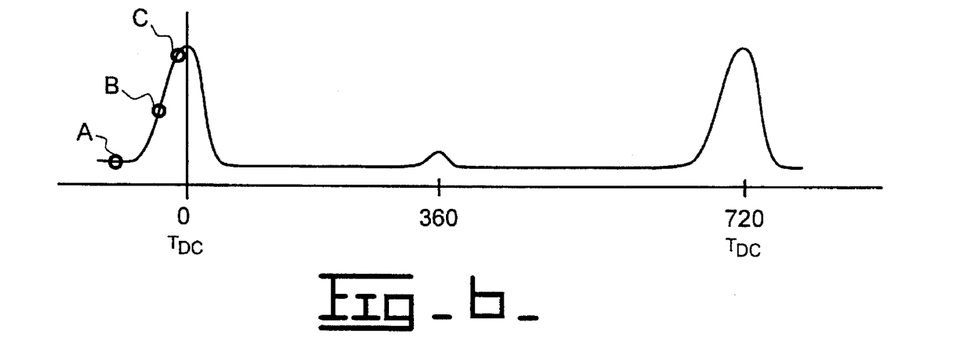
FIG. 6 shows a pressure profile associated with an engine cylinder.
Figure 7A:
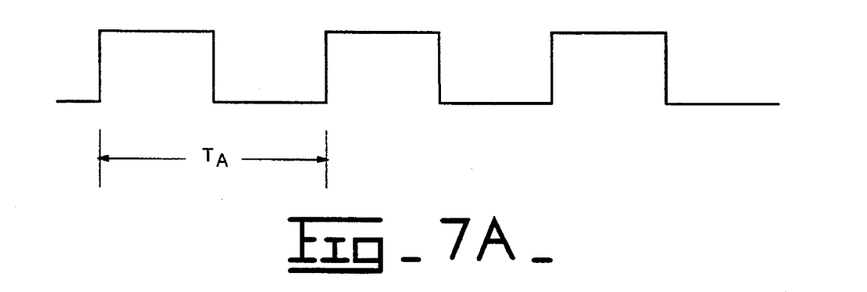
FIG. 7 shows a plurality of capacitive signal traces associated with the pressure profile of FIG. 6, where the capacitive signal traces are indicative of the engine power stroke.
Figure 7B:
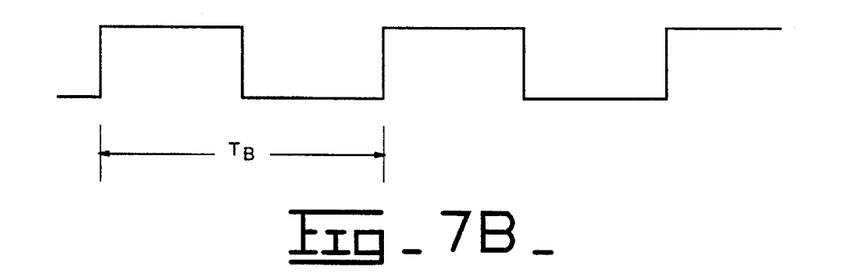
Figure 7C:
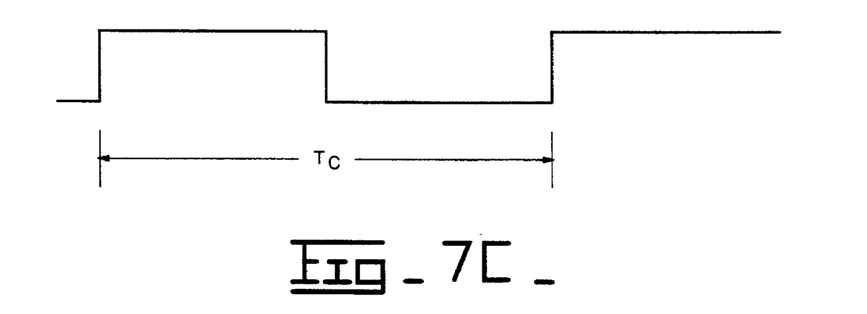

Illustrated in FIG. 6 is the cylinder pressure, i.e., pressure profile, shown with respect to the crank angle for one engine cylinder. Illustrated in FIG. 7 are high resolution traces of selected portions of the capacitive signal that correspond to the pressure profile shown in FIG. 6. Note that, the period of the capacitive signal changes proportional to the pressure change within the cylinder. For example, FIG. 7A shows a capacitive signal trace having a period $T_A$ that corresponds to a piston position at Bottom Dead Center (BDC). FIG. 7B shows a capacitive signal trace having a period $T_B$ that corresponds to a piston that is approaching TDC. FIG. 7C shows a capacitive signal having a period $T_C$ that corresponds to a piston position that is at TDC. As shown, the period of the capacitive signal is indicative of the piston position or the associated power stroke of the cylinder, where $(T_C > T_B > T_A)$. Thus, by measuring the period of the capacitive signal, the piston position or power stroke of the cylinder may be known.

Figure 8:
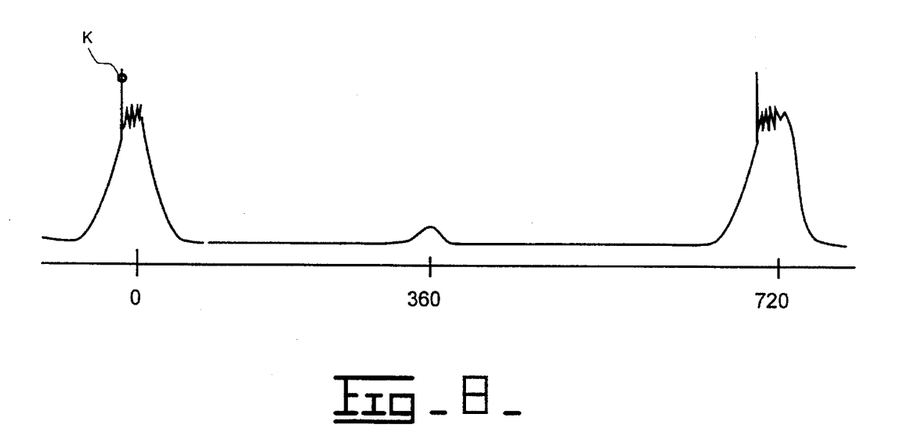
FIG. 8 shows a pressure profile associated with an engine cylinder that is exhibiting knocking characteristics.
Figure 9:
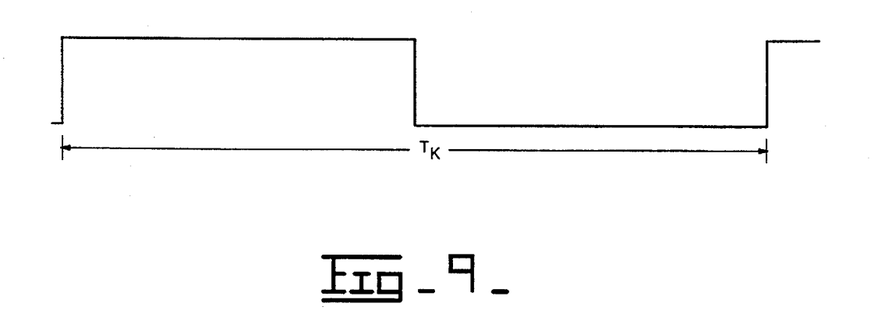
FIG. 9 shows a capacitive signal trace associated with the pressure profile of FIG. 8, where the capacitive signal is indicative of a knocking cylinder.

Another engine operating parameter pertains to "engine knock". As is well known, engine knock is accompanied by a large increase in cylinder pressure. Reference is now made to FIG. 8, which shows the pressure profile associated with a "knocking" cylinder. FIG. 9 shows a high resolution trace of a portion of the capacitive signal that corresponds to the pressure profile of FIG. 8. The illustrated capacitive signal period is associated with the peak pressure of the knocking cylinder. Note, the capacitive signal period $T_K$ associated with the "knocking" engine cylinder is much greater than the capacitive signal period $T_C$ associated with the "normal" engine cylinder.

Figure 10:
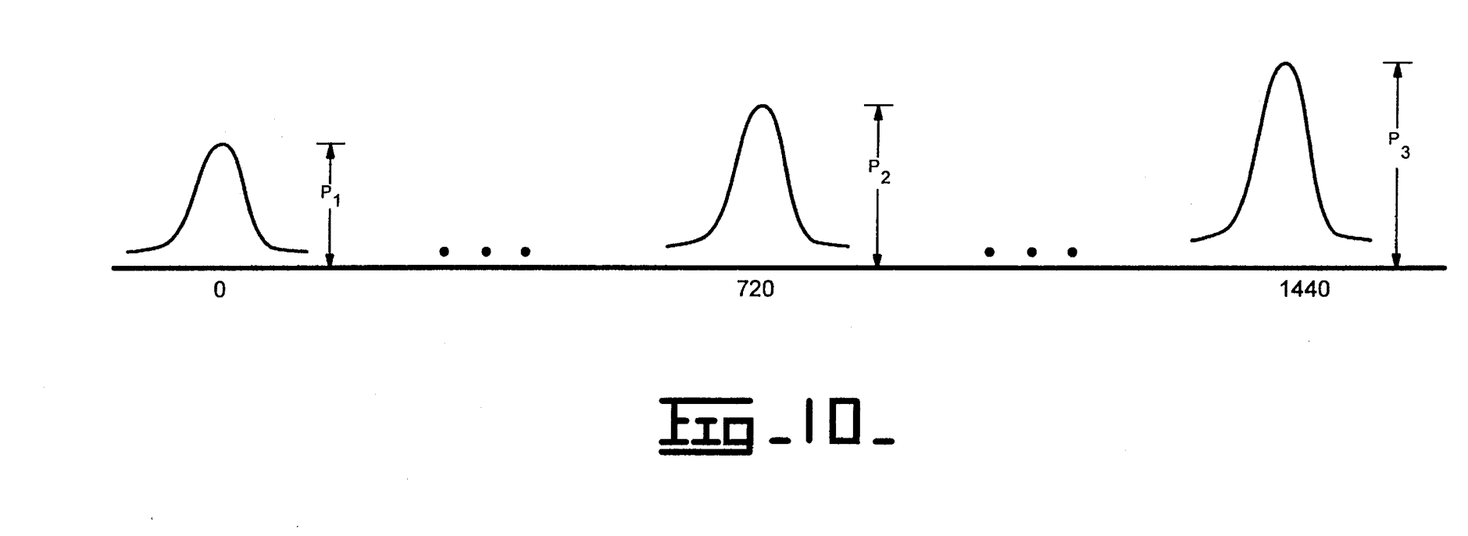
FIG. 10 shows a pressure profile associated with an engine cylinder that is exhibiting increased torque characteristics.
Figure 11:
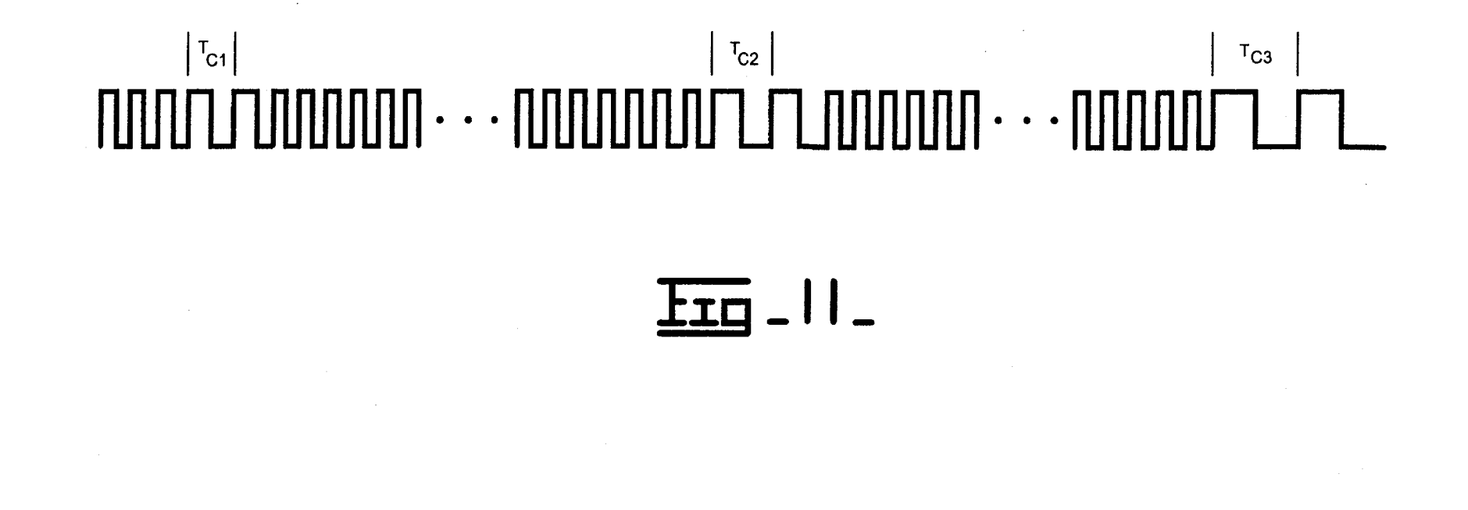
FIG. 11 shows a capacitive signal trace associated with the pressure profile of FIG. 10, where the capacitive signal is indicative of the cylinder torque load.

Additionally, another engine operating parameter pertains to the torque produced by the engine. It is well known that the greater the engine torque, the greater the corresponding cylinder pressure. Thus, because the capacitive signal is indicative of cylinder pressure, the engine torque may be determined. Reference is made to FIG. 10, which shows the cylinder pressure profile over several cylinder firings. In this example, each successive cylinder firing produces increasing torque, which corresponds to an increasing cylinder pressure. Shown in FIG. 11, is the corresponding capacitive signal. Accordingly, as the cylinder pressure increases, so does the period of the capacitive signal. Thus, the corresponding torque may be determined based on the duration of the capacitive signal period. Note that, although the capacitive signal period increases with increased engine torque, an engine knocking condition is distinguished from a high engine torque condition due the extraordinarily high pressures associated with engine knocking. Thus, $T_{c3}$ is much less than $T_k$.

The engine parameters discussed above were primarily based on the engine-to-head capacitance 205. Accordingly, the engine-to-head capacitance 205 is the dominant capacitance when the piston is at or about TDC. However, as the piston approaches bottom-dead-center (BDC), the other capacitance values represented by FIG. 2, become dominant. Thus, dependant on the piston position, the capacitive signal gives relevant information to other engine parameters. This will become more apparent from the below discussion.

Figure 12:
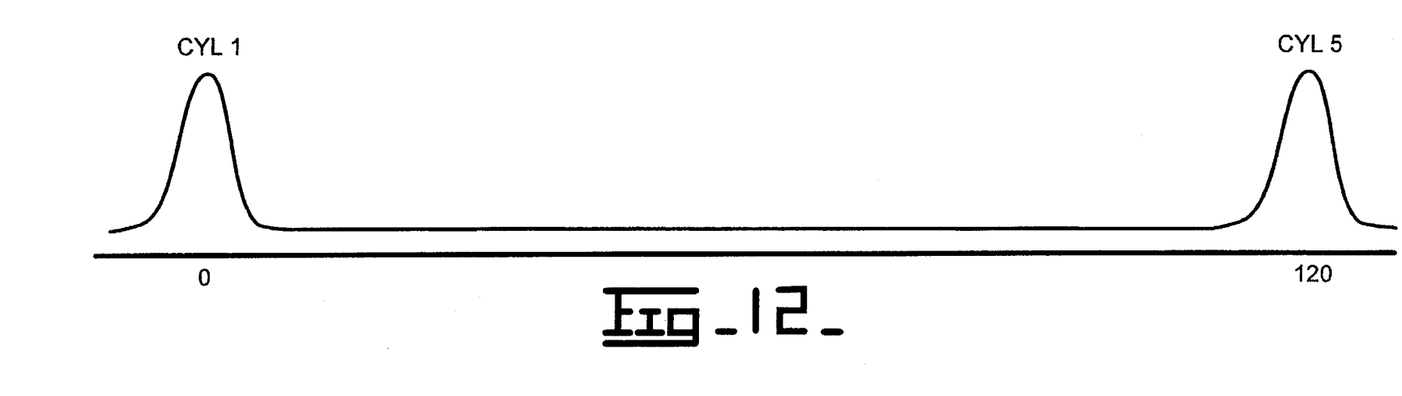
FIG. 12 shows a pressure profile associated with two successive cylinder firings.
Figure 13:
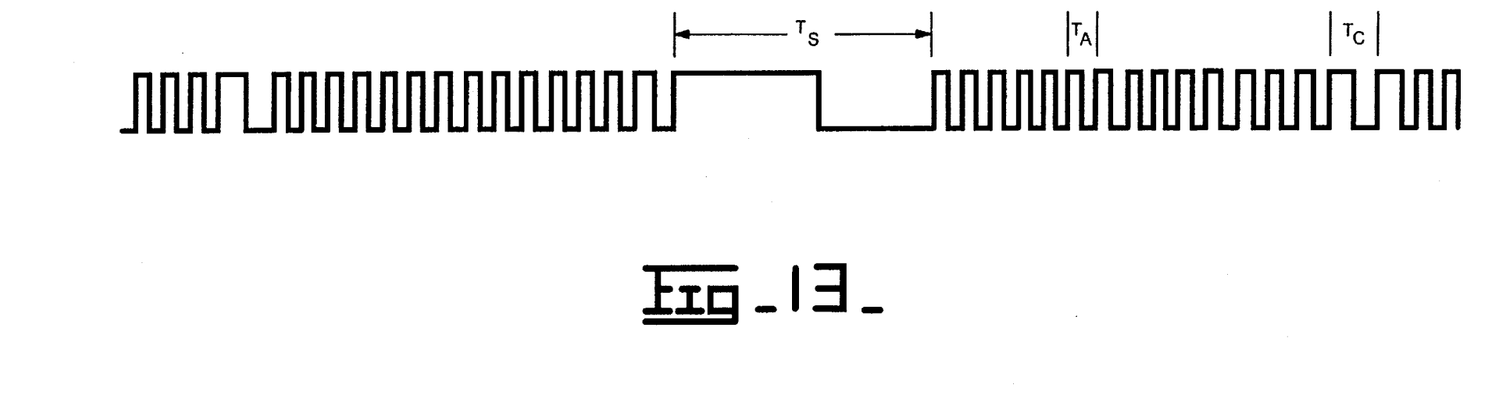
FIG. 13 shows a capacitive signal trace associated with the pressure profile of FIG. 12, where the capacitive signal is indicative of a lubricating oil failure condition.

A lubricating failure condition is another engine parameter that may be determined. For example, inadequate lubrication will cause the piston to effectively "short" to the cylinder wall. Consequently, the piston-to-wall capacitance 165 causes a capacitive signal to be produced with a period, $T_S$. ($T_S$ has a greater value than $T_K$.) This phenomena may be also referred to as piston scuffing. Shown at FIG. 12 is the pressure profile associated with two successive cylinder firings, and the corresponding capacitive signal trace is shown in relation to FIG. 13. The "shorting" of the piston-to-wall capacitance 165 of an engine cylinder causes an intermittently produced period, $T_S$, that occurs in a region between successive cylinder firings.

Figure 14:
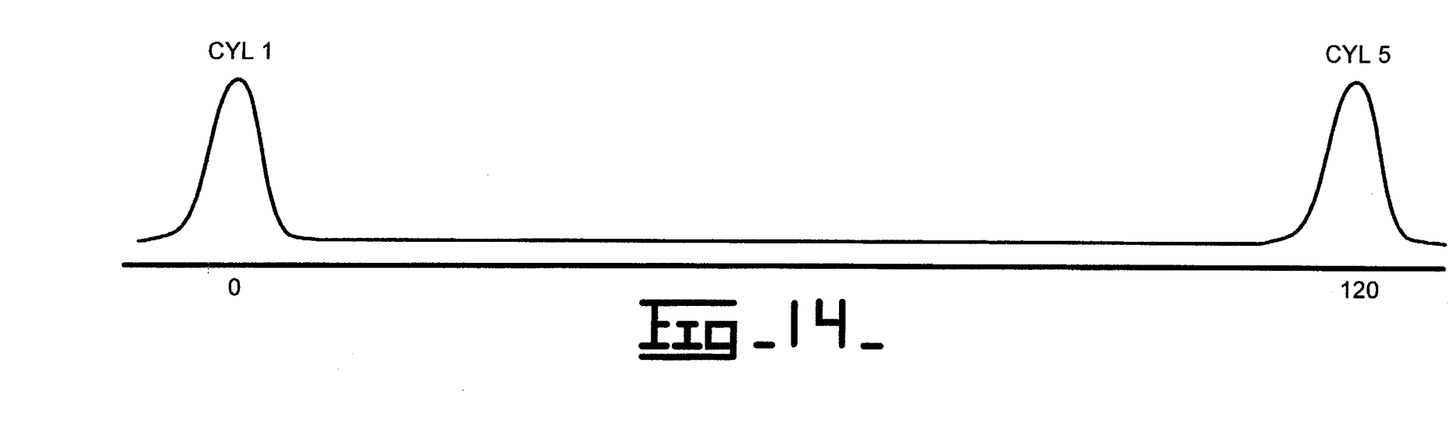
FIG. 14 shows a pressure profile associated with two successive cylinder firings.
Figure 15:
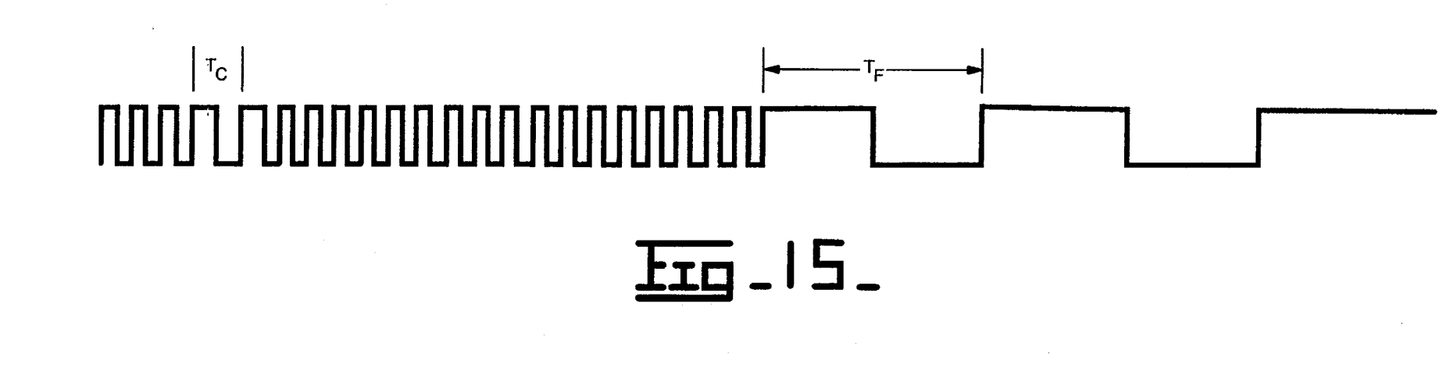
FIG. 15 shows a capacitive signal trace associated with the pressure profile of FIG. 14, where the capacitive signal is indicative of a main bearing failure condition.

Another engine parameter pertains to incipient failure of the main bearing. Shown at FIG. 14 is the pressure profile associated with two successive cylinder firings, and the corresponding capacitive signal trace is shown in relation to FIG. 15. Here, a bearing failure causes the main bearing capacitance to short, which causes a continuously produced period, $T_F$, where $T_F$ has a greater value than $T_S$.

Another engine parameter pertains to valve/piston clashing. For example, it is possible that the valve timing may be adjusted such that either the intake or exhaust valve opens while the piston is at TDC. If this occurs the piston will strike a valve, which will cause a short circuit condition of the piston-to-head capacitance 205. The short circuit condition causes an intermittently produced period, $T_S$. Although a valve/piston clashing condition, as well as, a piston scuffing condition both cause the capacitive signal to be produced with an intermittent period, $T_S$ —the time in which the intermittent period, $T_S$, occurs relative to the crank angle determines which engine operating parameter is taking place. This is best explained by TABLE 1, shown below.

TABLE 1

| Parameter | Occurrence | Period |
| --- | --- | --- |
| Knock | TDC (at cylinder firing) +/− 50 degrees | $T_K$ |
| Valve/Piston Clash | TDC (not at cylinder firing) +/− 30 degrees | $T_S$ |
| Piston Scuffing | 50 degrees to 670 degrees (not at TDC) | $T_S$ |

TABLE 1-continued

| Parameter | Occurrence | Period |
| --- | --- | --- |
| Bearing Failure | 0 degrees to 720 degrees | $T_F$ |
| Torque | TDC (at cylinder firing) +/− 50 degrees | $T_{C1}, T_{C2}, T_{C3}$ |

Thus, depending on when the distinguishing capacitive signal period occurs relative to the crank angle or piston position, the type of engine parameter may be determined. Note, although the above table pertains to a four-stroke engine, it will be recognized by those skilled in the art, that the present invention may be equally applicable to a two-stroke engine.

Figure 16:
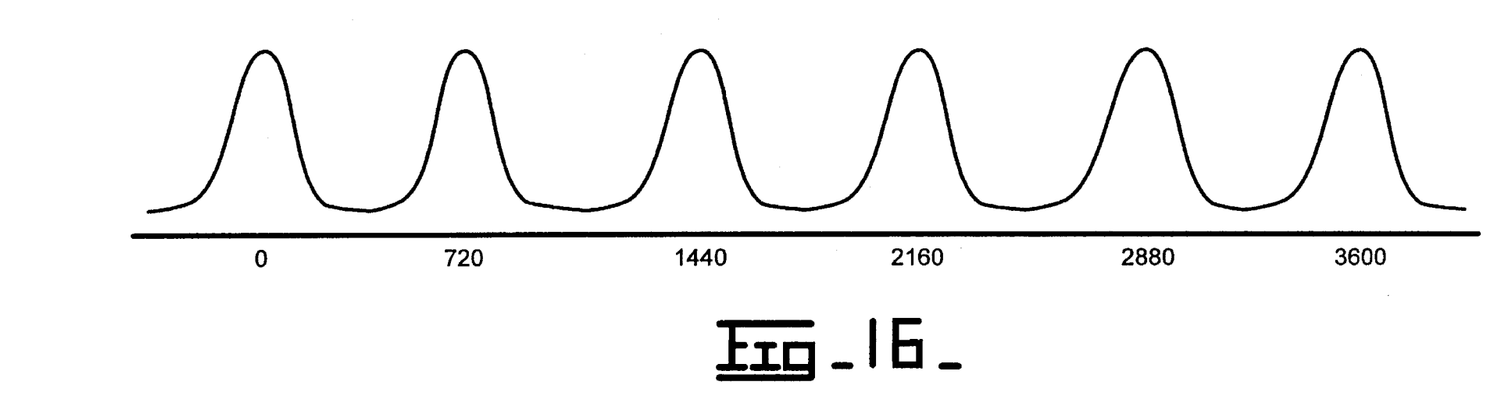
FIG. 16 shows a pressure profile associated with an engine cylinder over several engine cycles.
Figure 17:
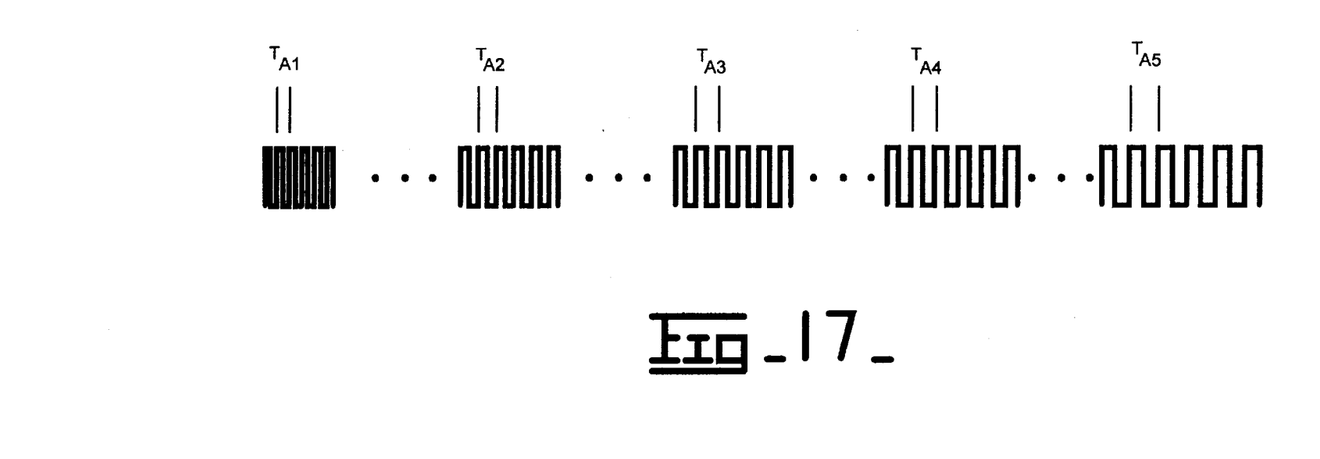
FIG. 17 shows a capacitive signal trace associated with the pressure profile of FIG. 16, where the capacitive signal is indicative of long term component wear of the engine.

Finally, another engine parameter pertains to long term wear of various engine components. Recall that the effective piston capacitance is due to the various engine components. As each of the components wear, a low frequency vibration results. For example, as the crankshaft wears, the main bearing will tend to "wobble" causing the main bearing capacitance 150 to change. As the crankshaft continues to wear, the change in main bearing capacitance 150 becomes more pronounced. The capacitance change will cause the capacitive signal period to proportionally increase. In this example, the change in the main bearing capacitance 150 is indicated in response to the piston being at or about BDC. To better illustrate this phenomena, reference is made to FIGS. 16 and 17, where FIG. 16 shows the pressure profile for a single cylinder over several engine cycles and FIG. 17 shows the corresponding capacitive signal trace. Note that, the capacitive signal period increases between the pressure pulses with each successive engine cycle. The increase is indicative of long term wear of an engine component.

Figure 18:
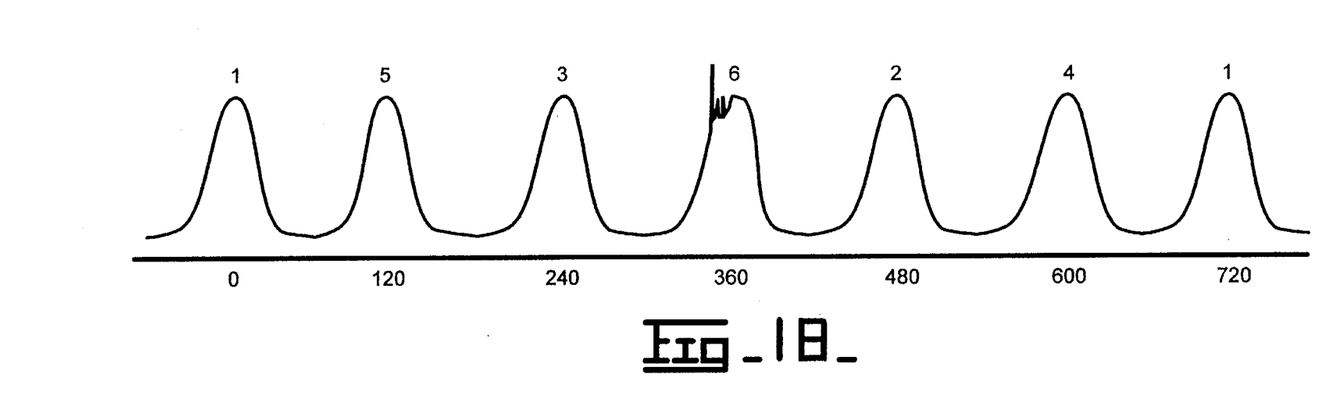
FIG. 18 shows a pressure profile associated with a plurality of engine cylinders.
Figures 19, 20:
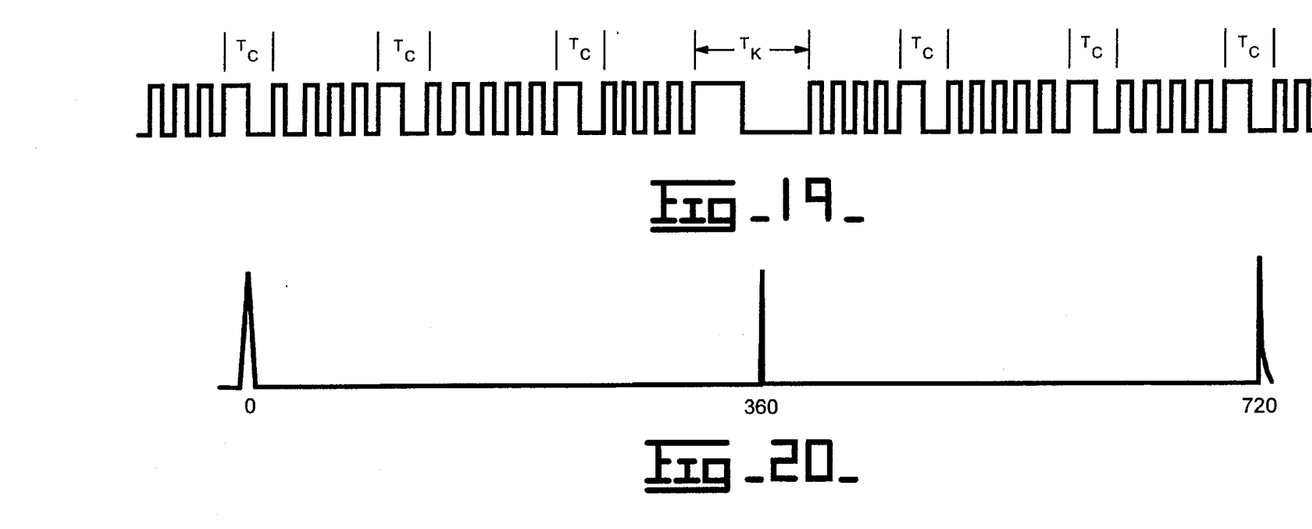
FIG. 19 shows a capacitive signal trace associated with the pressure profile of FIG. 19.
FIG. 20 shows a timing signal that indicates one complete revolution of the engine crankshaft.

Although the above have been described with respect to a single cylinder (for simplicity), the present invention may equally be used to determine the operating parameters of a multi-cylinder engine. For example, as shown in FIG. 18, the pressure profile of a six cylinder engine is shown, where the firing order is cylinders 1, 5, 3, 6, 2, and 4. The corresponding capacitive signal is shown with respect to FIG. 19. Although the actual capacitive signal has a much finer resolution, one can see that the firing order of each cylinder may be determined from capacitive signal, which is indicated by the period $T_c$. Moreover, a knocking condition in cylinder 6 is shown by the period $T_K$. Finally, FIG. 20 shows a timing signal that indicates one complete revolution of the crank shaft. The timing signal is used to aid in determining the firing order of the engine and may be produced in a manner that is well known in the art.

Finally, it is noted that the control means 410 may use digital processing techniques to produce a digital representation of the pressure profile based on the period of the capacitive signal. The digital representation may be displayed by the display means 415 on a liquid crystal display, or the like. Thus, a test engineer may visually monitor the engine events or operating parameters in real-time.

We claim:

1. An apparatus for sensing a plurality of operating parameters of a mechanical device, the mechanical device including a housing and a piston moveable relative to the housing, comprising:

power means for supplying electrical energy to the piston, wherein lubricating oil is disposed between the piston and the housing, thereby acting as a dielectric, whereby the piston and the housing form a variable capacitor having a capacitance value, the capacitance value varying as a function of the relative position of the piston to the housing;

oscillating means for producing a capacitive signal indicative of the capacitance value of the variable capacitor; and control means for receiving the capacitive signal and determining one of a plurality of operating parameters of the mechanical device.

2. An apparatus, as set forth in claim 1, wherein the capacitive signal has period, the period being a function of the capacitance value of the variable capacitor.

3. An apparatus, as set forth in claim 2, wherein the mechanical device includes an internal combustion engine, the internal combustion engine, including a crankshaft being connected to one or more pistons.

4. An apparatus, as set forth in claim 3, including a capacitive coupling that directs electrical energy to the engine crankshaft to energize one or more pistons.

5. An apparatus, as set forth in claim 4, wherein the capacitive coupling, includes:

a cylindrical tube disposed in a bore; and a sleeve disposed around the tube, wherein electrical energy is supplied to the cylindrical tube to cause the crankshaft to receive electrical energy.

6. An apparatus, as set forth in claim 3, wherein the control means includes means for receiving the capacitive signal and determining power stroke of the engine.

7. An apparatus, as set forth in claim 3, wherein the control means includes means for receiving the capacitive signal and determining whether an engine cylinder is knocking.

8. An apparatus, as set forth in claim 3, wherein the control means includes means for receiving the capacitive signal and determining torque of the engine.

9. An apparatus, as set forth in claim 3, wherein the control means includes means for receiving the capacitive signal and determining a lubricating oil failure condition of the engine.

\* \* \* \* \*